(12) United States Patent
Sghairi et al.

(10) Patent No.: US 8,761,969 B2
(45) Date of Patent: Jun. 24, 2014

(54) FLIGHT CONTROL SYSTEM AND AIRCRAFT COMPRISING IT

(75) Inventors: Manel Sghairi, Toulouse (FR); Patrice Brot, Ramonville Saint-Agne (FR); Jean-Jacques Aubert, Pibrac (FR); Agnan De Bonneval, Labege (FR); Yves Crouzet, Ramonville Saint Agne (FR)

(73) Assignees: Airbus Operations S.A.S., Toulouse (FR); Centre National de la Recherche Scientifique (CNRS), Paris (FR)

( * ) Notice: Subject to any disclaimer, the term of this patent is extended or adjusted under 35 U.S.C. 154(b) by 616 days.

(21) Appl. No.: 12/688,268

(22) Filed: Jan. 15, 2010

(65) Prior Publication Data

US 2010/0222943 A1    Sep. 2, 2010

(30) Foreign Application Priority Data

Feb. 10, 2009 (FR) ...................................... 09 50831

(51) Int. Cl.
    *B64C 13/24* (2006.01)
(52) U.S. Cl.
    CPC ..................................... *B64C 13/24* (2013.01)
    USPC .......................... 701/4; 714/11; 714/E11.055
(58) Field of Classification Search
    USPC .............................................................. 701/4
    See application file for complete search history.

(56) References Cited

U.S. PATENT DOCUMENTS

| | | | | |
|---|---|---|---|---|
| 4,472,780 A | * | 9/1984 | Chenoweth et al. | 701/4 |
| 5,274,554 A | * | 12/1993 | Takats et al. | 701/29.2 |
| 6,532,550 B1 | * | 3/2003 | Crew et al. | 714/11 |
| 7,209,809 B2 | * | 4/2007 | Yeh | 701/3 |
| 7,725,215 B2 | * | 5/2010 | Stange et al. | 701/1 |
| 7,765,427 B2 | * | 7/2010 | Stange et al. | 714/10 |
| 2005/0085957 A1 | * | 4/2005 | Yeh | 701/3 |
| 2006/0126256 A1 | * | 6/2006 | Forest et al. | 361/139 |
| 2007/0033195 A1 | * | 2/2007 | Stange et al. | 707/10 |
| 2007/0033435 A1 | * | 2/2007 | Stange et al. | 714/15 |
| 2007/0135975 A1 | * | 6/2007 | Stange et al. | 701/3 |
| 2010/0084517 A1 | * | 4/2010 | Benson et al. | 244/228 |
| 2011/0118906 A1 | | 5/2011 | Fervel et al. | |

FOREIGN PATENT DOCUMENTS

FR    2 927 308 A1    8/2009

OTHER PUBLICATIONS

U.S. Appl. No. 13/103,319, filed May 9, 2011, Brot.
U.S. Appl. No. 12/690,510, filed Jan. 20, 2010, Sghairi, et al.

* cited by examiner

*Primary Examiner* — Shelley Chen
(74) *Attorney, Agent, or Firm* — Oblon, Spivak, McClelland, Maier & Neustadt, L.L.P.

(57) ABSTRACT

The flight control system comprises:
   at least one actuator (13) for a mobile surface of the said aircraft;
   a flight control module (12) in communication with the said actuator (13), the said module comprising at least a first and a second computer (14-1, 14-2, 14-3, 15-1, 15-2, 15-3), each computer being adapted for calculating a control command established according to at least one predetermined law for control of the said flight surface; the said actuator (13) comprising logical means (18, 19) adapted for comparing the commands of the said computers (14-1, 14-2, 14-3, 15-1, 15-2, 15-3) and for determining on the basis of these commands the action to be executed on the said mobile surface.
The aircraft comprises such a system.

10 Claims, 4 Drawing Sheets

FLIGHT CONTROL SYSTEM AND AIRCRAFT COMPRISING IT

This invention relates to flight control systems (Flight Control Systems) present in aircraft.

BACKGROUND

These flight control systems are at the interface between the flying means (joystick, rudder bar, etc.) and the various mobile flight surfaces of the aircraft (such as the vertical, horizontal rudders, the ailerons, the stabilizers, etc.).

Modern airliners possess "fly by wire"-type flight control systems in which mechanical actions on the flying means are converted into signals transmitted to actuators controlling the movement of the flight surfaces, these commands being transmitted to the actuators by advanced computers.

These commands are calculated according to several types of laws. One of these laws, called normal law, is an assisted-flying law that reprocesses the flying instructions provided by the flying means in order to optimize the flying conditions (comfort of the passengers, stabilization of the airplane, protection of the flight domain, etc). Another law, known as direct law, is a law that only retranscribes the instructions for movement of the airplane transmitted by the electrical flight controls without reprocessing of these signals intended to improve flying performances.

There already is known, as illustrated on FIG. 1, a flight control system 1 comprising a control module 2 having two sets of computers 4 and 5 so as to determine the control commands to be transmitted to actuators 3.

Set 4 comprises two computers 4-1 and 4-2 capable of calculating the control of actuators 3 established according to the normal and direct control laws (these computers are called primary computers) and a computer 4-3 only capable of calculating this control established according to the direct law (this computer is called secondary computer).

Set 5 comprises a primary computer 5-1 and two secondary computers 5-2 and 5-3.

All these computers are installed in an avionic bay and communicate with the actuators via direct point-to-point analog links.

The actuators are connected to one or two computers, with in the case of two computers a "master/hold" architecture; the master computer ascertains the validity of the control signal transmitted to the actuator which ensures the integrity of the device. When the master computer breaks down, the computer "on hold" takes over, which ensures that a computer is always available.

In order to ascertain the validity of its command, each computer has a dual calculation unit structure (it concerns dual-path computers also called "duplex" computers), not illustrated on FIG. 1.

The first unit is a control (COM) unit which implements the processing necessary for carrying out the functions of the computer, namely determining a control signal to an actuator.

The second unit is a surveillance or monitoring (MON) unit which for its part performs the same types of operations, the values obtained by each unit then being compared and, if there is a discrepancy that exceeds the authorized tolerance threshold, the computer is automatically disabled. It then becomes inoperative and is declared out of order so that another computer can substitute for it in order to implement the functions abandoned by this out-of-order computer.

In this way each computer is designed to detect its own breakdowns and to inhibit the corresponding outputs, while indicating its condition.

The hardware of the primary and secondary computers is different so as to minimize the risks of simultaneous failure of the set of computers (hardware dissimilarity).

Moreover, the hardware of the two paths (COM and MON) of each computer is identical, but for reasons of security the software of these two paths is different so as to ensure a software dissimilarity.

SUMMARY

The invention seeks to provide a flight control system that has a modified architecture in comparison with that of the prior art described above, at once less costly in hardware and software resources while meeting the same requirements for security and availability as the system of the prior art.

To this end, it proposes a flight control system for an aircraft comprising:
  at least one actuator for a mobile flight surface of the said aircraft;
  a flight control module in communication with the said actuator, the said module comprising at least a first and a second computer, each computer being adapted for calculating a control command established according to at least one predetermined law for control of the said flight surface; characterized in that the said actuator comprises logical means adapted for comparing the commands of the said computers and for determining, on the basis of these commands, the action to be executed on the said mobile surface.

In the system according to the invention, comparison of the commands of the computers no longer is performed at the computers, but at each actuator.

Each actuator thus is in a position to determine by itself, on the basis of the computer commands that are transmitted thereto, the action to be executed on the mobile flight surface (that is to say the amplitude of movement of this surface).

It thus also is in a position, by virtue of the logical means that it comprises, to determine which commands to use as a basis for defining the action to be executed and to reject the commands for which comparison with the other commands shows that they have a fault.

Since the step of determining the action to be executed is moved to the actuator, this also makes it possible to produce simpler and less costly computers while providing a greater flexibility for the layout of the system.

This makes it possible, in particular, to dispense with the "COM/MON" and "master/hold" architectures of the prior art (which significantly minimizes the total number of computers) while preserving a high level of security.

According to optional characteristics:
  the said logical means have a voting architecture; and/or
  the said first computer belongs to a first group of computers, the said second computer belongs to a second group of computers and the said voting architecture has a first voting level for each said group and a second voting level at the output of the two said groups.

The determination of the action to be executed by a voting architecture makes it possible to reliably determine this action without its necessitating any more hardware and software resources.

According to other optional characteristics:
  the logical means of the said actuator also are adapted, for each computer, for sending back or not sending back a failure message depending on the result of the said comparison of the commands; and/or
  the said system comprises a plurality of actuators and the said computers are adapted for being disabled when a number of actuators exceeding a predetermined number sends back the said failure message.

Since the actuators are in a position to compare the commands of the computers among themselves, they are capable of detecting which computers are failing and of sending a message back to them to so inform them.

In the system according to the invention, the functions fulfilled by the MON unit of the prior-art computers with duplex structure thus are implemented by the actuators together with the other computers by virtue of which it is made possible to utilize computers that have only a single path (computers known as "simplex," that is to say devoid of redundant processors) instead of two ("duplex" computers).

According to other optional characteristics, the said logical means of each actuator also are adapted, when all the still-operational computers calculate the said control command according to the same program, for sending a software reconfiguration request to one of the still-operational computers so that it functions according to a program different from that of the other still-operational computers.

The software reconfiguration makes it possible to maximize the use of each computer, which contributes to minimizing the total number of computers while preserving, for the same control law, a software dissimilarity among computers.

According to still other optional characteristics:
- each actuator comprises a control unit and a unit for monitoring the said control unit;
- each unit is connected to the said first computer and to the said second computer; and/or
- one of the units is only connected to the said first computer and the other unit is only connected to the said second computer, the said control and monitoring units also being connected to one another.

The connecting of the control and monitoring units of the actuators with the sets of computers thus can be accomplished directly or indirectly (through the other unit).

In a second aspect, the invention also applies to an aircraft equipped with a system such as explained above.

BRIEF DESCRIPTION OF THE DRAWINGS

The explanation of the invention now will be continued with the detailed description of an exemplary embodiment, provided below in an illustrative but not limitative capacity, with reference to the attached drawings, on which.

DETAILED DESCRIPTION

Figure 1:
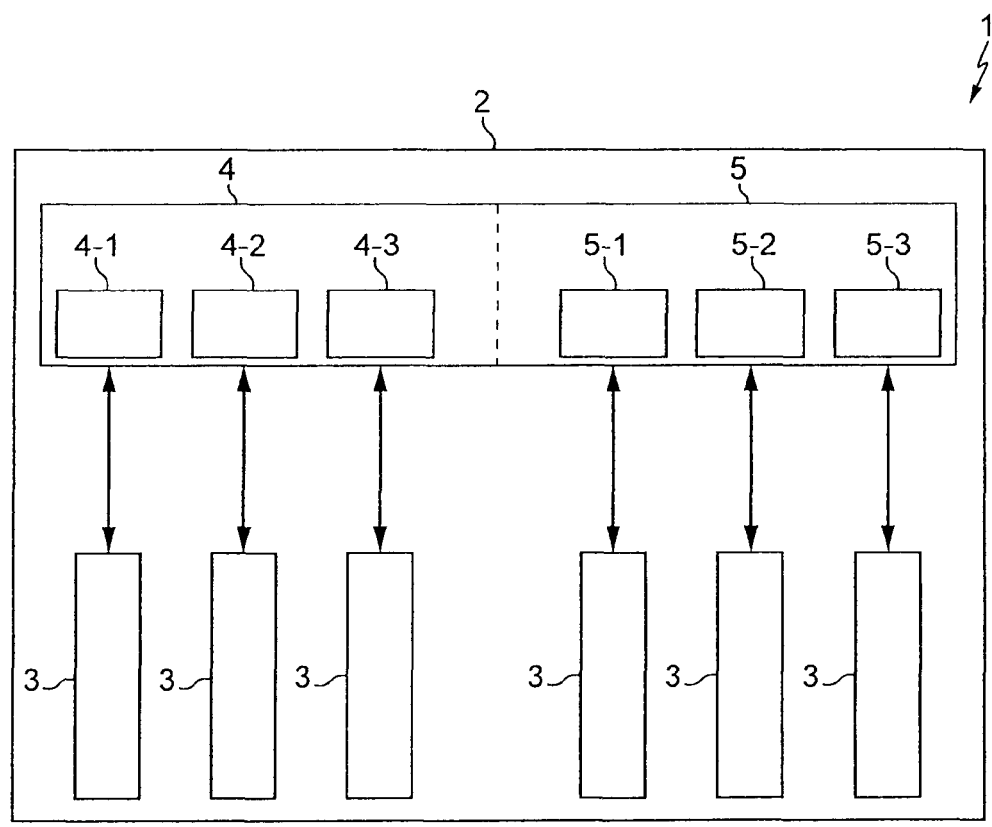
FIG. 1 is a schematic representation of a flight control system according to the prior art described above.
Figure 2:
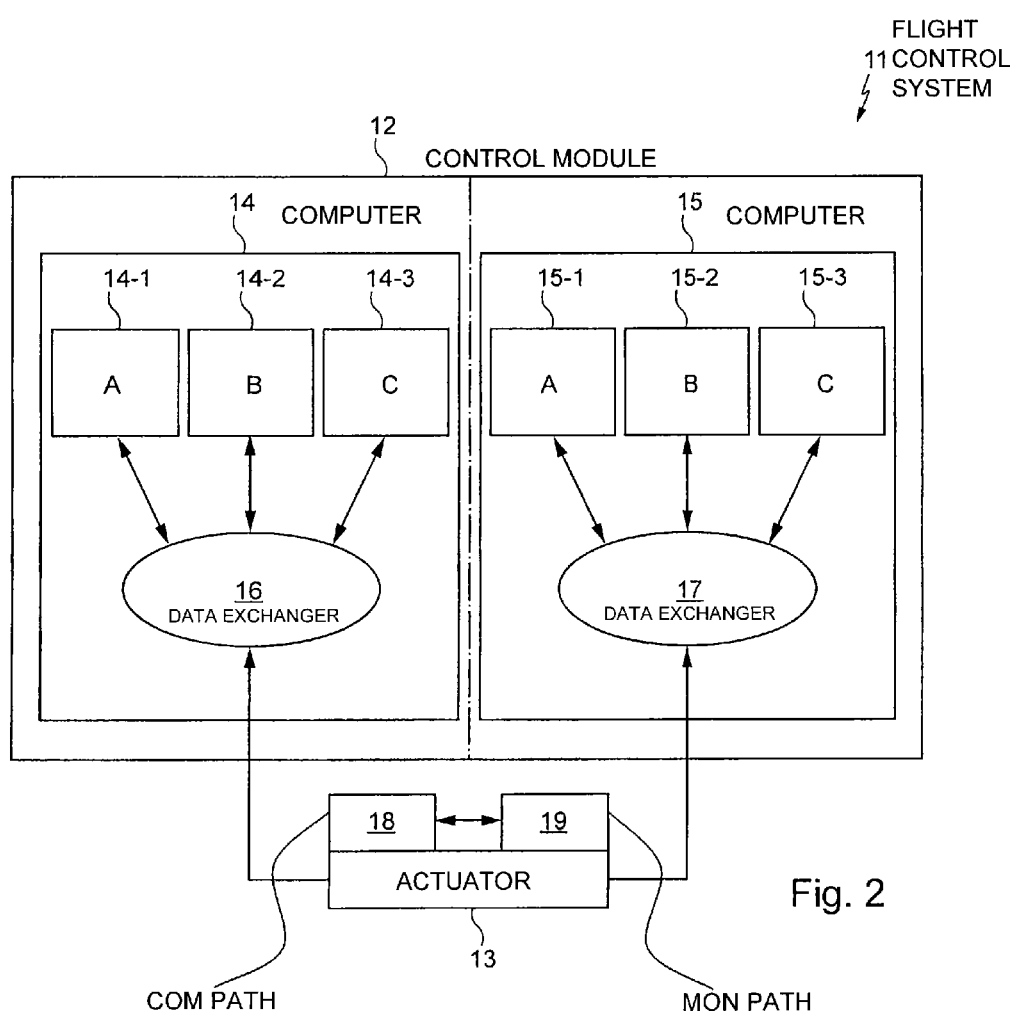
FIG. 2 is a schematic view of a flight control system according to the invention.

The flight control system according to the invention 11 illustrated on FIG. 2 has a control module 12 to transmit commands to a plurality of actuators 13.

Control module 12 comprises six "simplex" computers (they have only one path and a single calculation processor) distributed in two sets 14 and 15 of three computers, each set being connected to each actuator 13.

The set of computers 14 (respectively 15) communicates with actuators 13 through a digital data exchange means 16 (respectively 17) the structure of which will be explained in detail below with the aid of FIGS. 3 and 4.

The set of computers 14 (respectively 15) comprises two primary computers 14-1 and 14-2 (respectively 15-1 and 15-2) making it possible to calculate the control commands according to the normal law and according to the direct law as well as a secondary computer 14-3 (respectively 15-3) for calculating the control commands on the basis of the direct law alone.

The primary and secondary computers are of different hardware design in order to meet security requirements (hardware dissimilarity).

The 14-1 and 14-2 (respectively 15-1 and 15-2) primary computers function with two program variants A and B for calculation according to the normal and direct laws which are different from one another, while computer 14-3 (respectively 15-3) functions for calculation according to the direct law with a program variant C different from variants A and B.

In this way the calculation according to the normal law is obtained by two different programs (A and B) while the calculation according to the direct law also is obtained by two different programs (B and C or A and C or A and B). Software dissimilarity therefore is amply ensured for the determination of the control signals, which ensures a high level of security.

As will be seen below, each computer can be reconfigured on the spot according to failures.

These sets of computers are located in the avionic bay (the avionic bay is the space in which most of the electronic equipment items of an airplane are grouped together, in general situated beneath the useful space of the airplane) and are supplied by two separate electrical systems.

Each actuator 13 comprises two paths 18 and 19 (COM path and MON path) connected to two sets of computers 14 and 15 in such a way that each actuator communicates through its paths 18 and 19 with all the computers.

Path 18 (COM control unit) performs the functions of voting and selection and path 19 (MON monitoring unit) for its part carries out the same types of operations so that at the output the values obtained by each unit are compared and, in the event of disagreement, the actuator is disabled.

According to the logical architecture of actuators 13, known as massive voting architecture, all the computers (primary and secondary) of the two sets of computers 14 and 15 calculate the flying laws in order to generate the commands for control of the mobile flight surfaces. At each cycle, each computer calculates the instructions for all the valid actuators, and transmits the commands via means 16 and 17 to all the units 18 and 19 of all the actuators, and this independently of the validity of the commands calculated by each computer.

In the illustrated example, each actuator 13 therefore receives, per set of calculators, two commands for the normal law (originating from computers 14-1 and 14-2 for the set 14 and from computers 15-1 and 15-2 for the set 15) and three commands for the direct law (originating from computers 14-1 to 14-3 for the set 14 and from computers 15-1 to 15-3 for the set 15), so that, before the first breakdown, each actuator 13 has four instructions for the normal law and six instructions for the direct law.

On the basis of all of these instructions, the two units 18 and 19 of each actuator carry out voting operations.

The election algorithm is based on the commands of the computers and is implemented in each unit 18 and 19 of each actuator.

According to a first level, this algorithm uses a first voting (explicit voting) which determines for each set of computers, on the basis of the different signals provided by the computers (three for the direct law and two for the normal law), what is the number of results provided by the different computers which are acceptable (weight or confidence factor of the voting).

These results are considered as acceptable when they lie within a predetermined threshold S in relation to the voted value V which is the median of the three commands received (in the case of three commands) or the average of the two commands received (in the case of two commands), the value of threshold S being determined beforehand.

The number of acceptable results defines a weight P or confidence factor that indicates the number of units that are in agreement.

According to a second level, and in the case where the explicit voting of a set of computers no longer is capable of providing a result with a weight P greater than or equal to 2, the algorithm then uses a selective voting to bring into the process the computers making it possible to have the maximum of different software variants (A, B or C), or two or three different variants and in the hope of obtaining in the end a weight at least equal to two.

In this way, if, for example, the explicit voter of set 15 has a weight strictly less than two (so that the result of the explicit voting of set 15 is not usable), and if for set 14 one of the computers is unavailable (for example computer 14-3), then the information used by the process of final choice, by way of set 15, is that deriving from the computer of set 15 having the same software configuration as the unavailable computer of set 14 (or therefore computer 15-3 in the example). Likewise, if computers 14-1 and 14-2 are unavailable, it will be computers 15-1 and 15-2 that will be taken into account in the process of final choice, by way of set 15.

In this way, each actuator is in a position to reassign each computer of a set to the other set, this selective voting process thus making it possible to make maximum use of the availability of the computers.

Finally, the last step consists in taking into account the voted values originating from the two sets in the following manner:
- if for each set the command is transmitted only by a single computer and if these commands are transmitted with the same weight, the final command is the half-sum of the commands originating from each set, and otherwise the final command is equal to the command of the set that has the highest weight;
- if for one of the sets the command is transmitted by two computers and if for the other set the command is transmitted only by a single computer, the final result is the median value of the three values with at least two values that should be coherent (except if the weight of one of the two sets already is equal to two, in which case the other set is ignored);
- if for each set the command is transmitted by two computers, the final result derives from the voting of these four values with at least two values that should be coherent; and
- otherwise the command is unavailable.

This command so determined is going to be executed by the actuator to make the mobile surface move by the desired amount, the actuator choosing the normal law if the command for the normal law is available, or the direct law if the command for the normal law is unavailable but the command for the direct law is available. If no command is available, the actuator is disabled (inactive mode).

Furthermore, an actuator that detects a computer with erroneous performance during a certain period of time (that is to say if its command is not within the threshold S) permanently excludes same from its voting process.

Unit 18 transmits the result of its voting to unit 19 which is associated as well as to all the computers, by indicating the value that it has selected as well as the addresses of the computers that have calculated a command considered as equal to this value (the threshold apart).

If units 18 and 19 are in agreement on the voted value, unit 19 then transmits the same information items as unit 18 to all the computers, while if this unit is in disagreement with unit 18, the latter blocks it and the actuator is declared in breakdown, an actuator non-validity information item being transmitted to all the computers.

Each computer also receives the return of all the units 18 and 19 of all the actuators. It waits for this return of information items in order to know the validity of its command from all the actuators executing this command.

Each computer permanently invalidates its command for a group of actuators when at least a significant number of actuators among a group of actuators has detected a fault on this command (that is to say when this command has been invalidated at once by unit 18 and unit 19 of the actuator). This number depends on the type of surface controlled.

By group of actuators there is understood here the set of actuators that execute the same command on a control surface, such as, for example, four actuators associated with two horizontal rudders, three actuators associated with the vertical rudder, etc.

When a computer is declared in breakdown, either by itself or by the actuators, it is ignored by all the actuators and the other computers.

Each actuator having detected the breakdown of two primary computers running the same software sends a request for software reconfiguration to one of the two primary computers remaining valid. The choice of the computer is predefined and arbitrary, so that all the actuators have the same request.

The computer to be reconfigured effectively undertakes its reconfiguration when it receives a coherent reconfiguration request from a certain number of actuators.

For example, if computers 14-1 and 15-1 functioning with program A break down, a request is sent to one of the computers 14-2 or 15-2 (functioning with program B) in order that the latter is reconfigured and functions with program A so that the normal law is still obtained by two computers observing the principle of software dissimilarity.

Likewise, if the two computers 14-2 and 15-2 functioning with program B break down, a request is sent to one of the computers 14-1 or 15-1 (functioning with program A) in order that the latter is reconfigured and functions with program B.

The problem does not arise for the calculation of the direct law because this law can be calculated by each of the computers according to three programs (A, B or C) so that even if two computers functioning with the same program break down, the software dissimilarity is still preserved (A and B, A and C or B and C).

It will be noted that in this type of architecture, no interconnection between the computers is necessary, since it is through the actuators (comprising the comparison logic of the computers among them) that the invalidation of a computer is determined.

Moreover, this architecture also allows an additional control of the actuators from the computers. In fact, a computer detecting a disagreement between two units 18 and 19 of an actuator 13 considers the latter to be in breakdown and sends it a non-operation instruction.

However, and according to the decision mechanism similar to that of the computers, this actuator will apply this disablement instruction only when it is supported by the other computers (weight of voting greater than or equal to 2).

Figure 3:
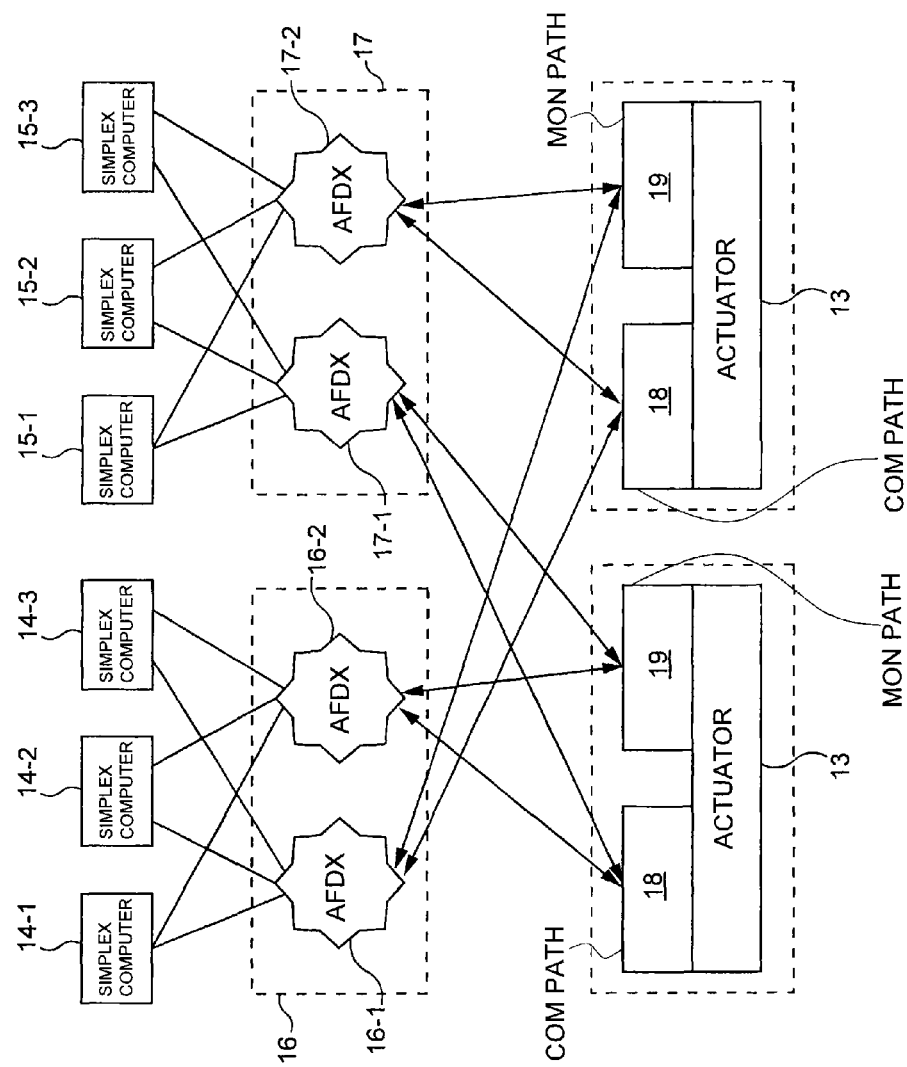
FIG. 3 is a view detailing the communication network allowing the transfer of information from the sets of computers that comprise the system according to the invention to the actuators of this system.

An exemplary communication network between the computers of module 12 and actuators 13 now is going to be described with the aid of FIG. 3.

This network comprises two data exchange means 16 and 17.

Means 16 (respectively 17) comprises two components 16-1 and 16-2 (respectively 17-1 and 17-2), each component comprising a 100 Mbit/s AFDX (Avionics Full Duplex switched Ethernet) bus, situated in the avionic bay or elsewhere in the fuselage of the airplane and connected to a micro-bus (with an output of 10 Mbit/s) situated close to the actuators (these buses are not illustrated on the Figure). These buses have been developed and standardized to meet the standards of the aeronautical field.

The AFDX networks are based on the principle of the switched networks, that is to say that the actuators and the computers in charge of transmission or reception of data are organized around switches through which these data pass in transit.

These networks form a digital link between the computers and the actuators, the multiplexing of the data so obtained making it possible to have each computer easily communicate with each actuator (which was not the case with the device of the prior art where the links between the computers and the actuators were point-to-point analog links).

Each means 16 and 17 is connected to each unit 18 and 19 of each actuator 13, so that each unit 18 and 19 is connected directly with each computer by the AFDX buses and the micro-buses.

Figure 4:
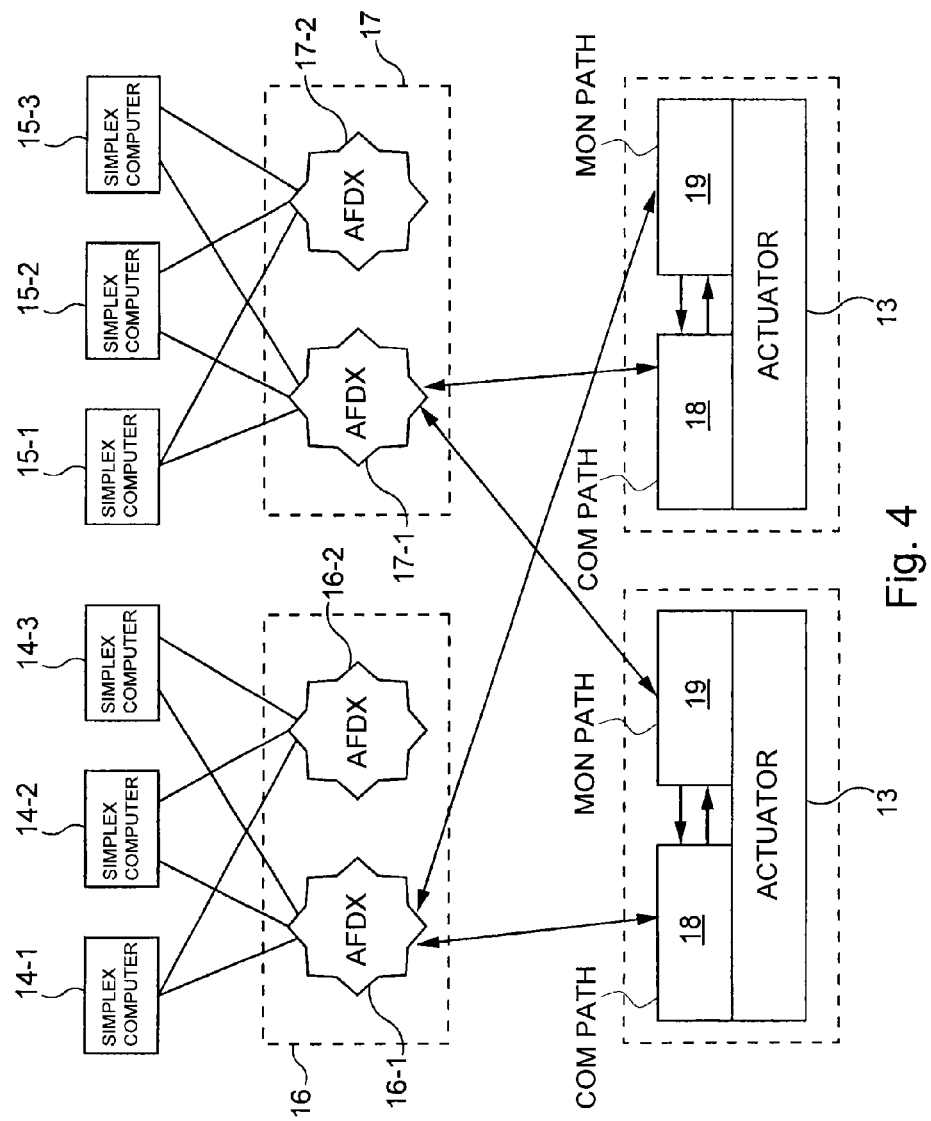
FIG. 4 is a view similar to FIG. 3 but for a variant of the communication network.

In a variant illustrated in FIG. 4, unit 18 of each actuator is only connected to one of the sets of computers while unit 19 is connected to the other of the sets of computers, with units 18 and 19 which are connected to one another in such a way that unit 18 can communicate all the same with the set of computers to which it is not directly connected through unit 19 and vice versa.

As a variant, units 18 and 19 of each actuator can share the same medium in order to communicate with the computer, by using so-called application CRC (Cyclic Redundancy Check), for signing their messages.

It also is possible to use other types of buses such as ARINC (Aeronautical Radio Incorporated) buses or any other type of communication means allowing a digital multiplexing, between the computers and the actuators provided that these are compatible with the standards in the aeronautical field.

In still another variant, it is not the normal and direct laws that are implemented in the computers, but any other type of law such as, for example, a law that, unlike the direct law, would be only partially degraded in relation to the normal law (following the loss of sensor signals from the airplane, for example).

Finally, it will be recalled that the number of computers can be varied according to needs and is not restricted to the number described in the examples illustrated in FIGS. 2 to 4.

Numerous other variants are possible according to circumstances, and in this connection it is recalled that the invention is not limited to the examples described and shown.

The invention claimed is:

1. A flight control system for an aircraft, comprising:
   at least one actuator to actuate a mobile flight surface of the said aircraft;
   a flight control module in communication with the said actuator, and comprising
   at least a first and a second single-path computer, each configured to calculate a control command established according to at least one predetermined law for control of the flight surface, the first and second single-path computers being connected to the actuator via a control path and a monitoring path, commands to cause an action to be executed on the mobile surface being provided to the actuator via the control path, the monitoring path being used to provide comparison values to the actuator to determine whether the commands received via the control path are valid,
   wherein said actuator comprises logic in the control path to compare commands received from the computers via the respective control and monitoring paths and to determine on the basis of these commands an action to be executed on the mobile surface, and
   the logic includes a voting architecture, the first computer belonging to a first group of computers, the second computer belonging to a second group of computers and the voting architecture having a first voting level for each of said first and second groups and a second voting level at outputs the first and second groups.

2. The flight control system according to claim 1, wherein the logic the actuator is further configured to send back or not send back, for each computer, a failure message depending on the result of the comparison of the commands.

3. The flight control system according to claim 2, further comprising:
   a plurality of actuators,
   wherein the first and second computers are further configured to be disabled when a number of actuators exceeding a predetermined number send back the failure message.

4. The flight control system according to claim 3, wherein logic of each actuator is configured to, when all computers that are not disabled calculate the control command according to a same program, send a software reconfiguration request to one of the computers that are not disabled to cause the one of the computers that are not disabled to function according to a program different from a program of the other of the computer that are not disabled.

5. The flight control system according to claim 1, wherein each actuator comprises a control unit in the control path and a monitoring unit in the monitoring path to monitor the control unit.

6. The flight control system according to claim 5, wherein both the command unit and the monitoring unit are connected to the first computer and to the second computer.

7. The flight control system according to claim 5, wherein the control units is only connected to the first computer and the monitoring unit is only connected to the second computer, the command and monitoring units also being connected to one another.

8. An aircraft equipped with a system according to any one of claims 1 to 7.

9. The flight control system according to claim 1, wherein a hardware architecture of the first computer is different from a hardware architecture of the second computer.

10. The flight control system according to claim 1, wherein the first single-path computer computes control commands using one of a normal law and a direct law, and the second single-path computer computes control commands using a direct law different from the direct law used by the first single-path computer.

* * * * *